No. 709,025. Patented Sept. 16, 1902.
R. W. LYLE.
MACHINE FOR CUTTING RECESSES IN CONDUIT SECTIONS.
(Application filed May 15, 1902.)
(No Model.) 2 Sheets—Sheet 1.
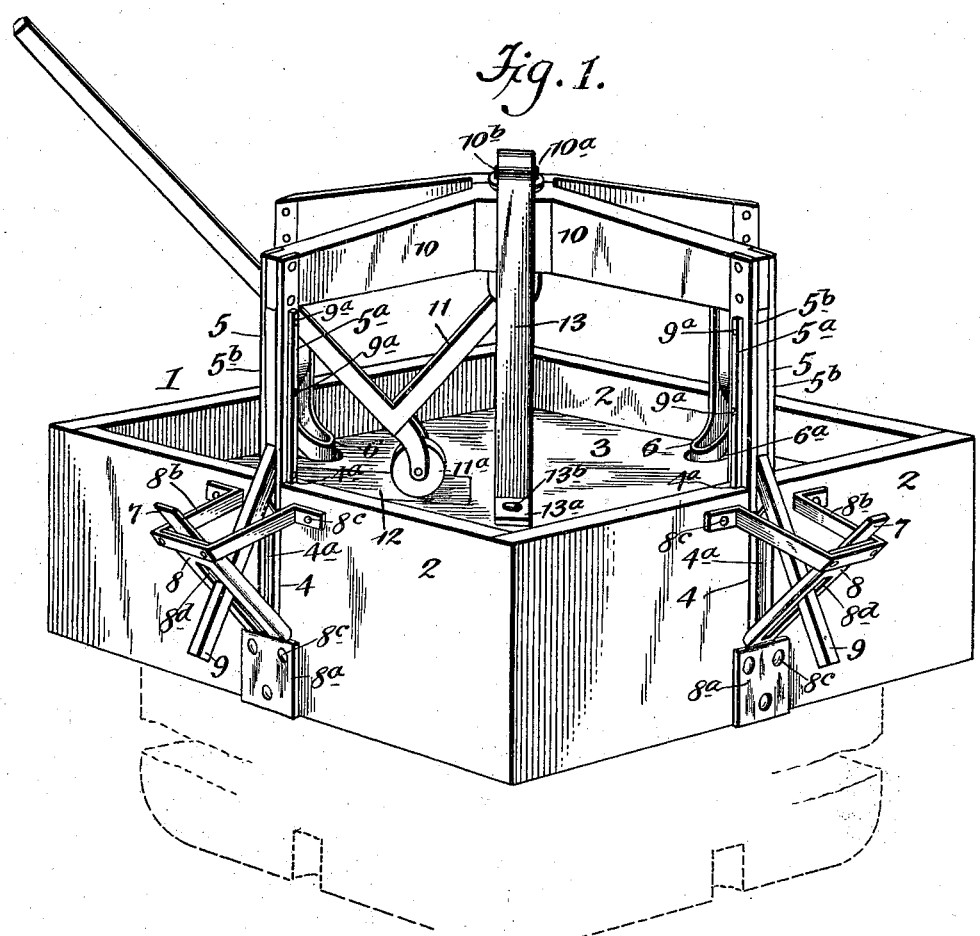
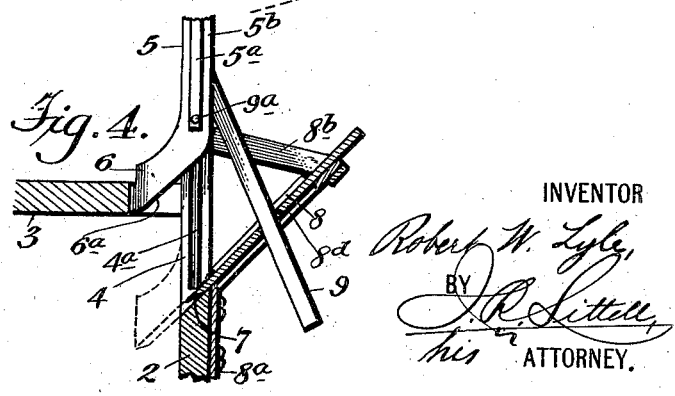
WITNESSES:
INVENTOR
Robert W. Lyle,
BY
his ATTORNEY.

No. 709,025. Patented Sept. 16, 1902.
R. W. LYLE.
MACHINE FOR CUTTING RECESSES IN CONDUIT SECTIONS.
(Application filed May 15, 1902.)
(No Model.) 2 Sheets—Sheet 2.
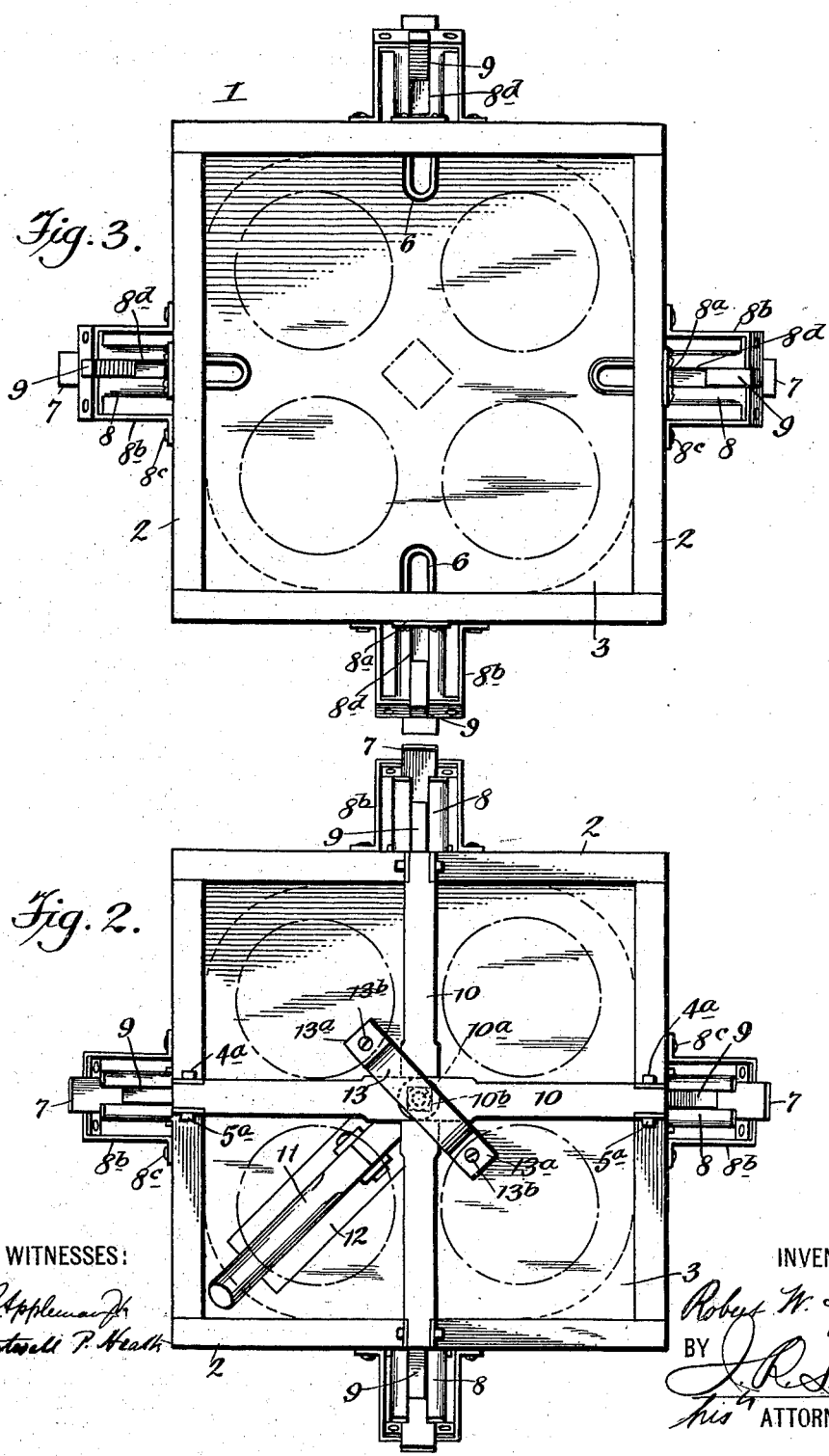
WITNESSES:
INVENTOR
Robert W. Lyle,
BY
his ATTORNEY.

UNITED STATES PATENT OFFICE.

ROBERT W. LYLE, OF PERTH AMBOY, NEW JERSEY.

MACHINE FOR CUTTING RECESSES IN CONDUIT-SECTIONS.

SPECIFICATION forming part of Letters Patent No. 709,025, dated September 16, 1902.

Application filed May 15, 1902. Serial No. 107,450. (No model.)

*To all whom it may concern:*

Be it known that I, ROBERT W. LYLE, a citizen of the United States, residing at Perth Amboy, in the county of Middlesex and State of New Jersey, have invented certain new and useful Improvements in Machines for Cutting Recesses in Conduit-Sections, of which the following is a specification.

This invention relates to machines for cutting recesses in conduit-sections, and has for its object to provide a device of the class described which will possess points of advantage in convenience, simplicity, inexpensiveness, effectiveness, and general efficiency.

Another object of the invention is to provide a device of the class described which will enable recesses to be cut in conduit-sections while the material of which said sections are composed is still green.

Another object of the invention is to provide a device of the class described which will enable recesses of different shapes to be cut in conduit-sections and which in each case will sever the material forming the core from the remainder of the conduit-section, so that the core may be readily removed.

Another object of the invention is to provide a device of the class described which when the cutters are withdrawn from the recess will remove the core cut from the recess therefrom.

Another object of the invention is to provide a device of the class described in which various forms of knives according to the form of recess desired may be inserted and in which the knives coact to sever the sides and bottom of the recess simultaneously.

In the drawings, Figure 1 is a perspective view of a machine for cutting recesses in conduit-sections embodying my invention with a conduit-section partly broken away in dotted lines. Fig. 2 is a plan view of the same. Fig. 3 is an inverted plan view of the same. Fig. 4 is a vertical section through one of the slotted sides of the machine-frame and the inclined knife adjacent thereto.

Corresponding parts in all the figures are denoted by the same reference characters.

Referring to the drawings, 1 designates a frame provided with side pieces 2, adapted to inclose and support the upper portions of the sides of a conduit-section, and with a top 3, adapted when the device is in operative position to rest upon the top of such conduit-section. The side pieces 2 extend above the top 3 and are provided intermediate their ends with recesses 4, extending from the top of the side pieces 2 a suitable distance toward the bottom and having grooves $4^a$ formed in their side walls. Slidably mounted in the recesses 4 are carriers 5, provided with tongues $5^a$, complementary to the grooves $4^a$. Means for cutting recesses of various shapes may be attached to the carriers 5. Such means may consist of hollow knives 6, the interior of such knives formed complementary to the cross-section of the recesses to be cut and the cutting edges $6^a$ of which knives 6 are arranged at angles to the carrier 5 complementary to the angle which it is desired the bottom of the recess shall bear to the sides of the conduit. In the form here shown such knives 6 have parallel sides and a rounded inner end, and the cutting edges $6^a$ are inclined downward. The knives 6 may be formed integral with the carriers 5, or secured thereto in any suitable manner, or detachably connected therewith, as may be found most convenient. In the form here shown they are made integral with the carriers 5. Means for severing the core of the recess at the bottom from the rest of the conduit are provided and adapted to be operated by the carriers 5 in timed relation to the knives 6. Such means consist of knives 7, sliding in slideways 8, arranged on the exterior of the side pieces 2 complementary to the angle which the bottom of the recess in the conduit-section is intended to bear to the sides of such section. In the form here shown the slideways 8 are inclined to the side pieces 2 at the angle of inclination of the cutting edges of the knives 6. The slideways 8 in the form shown are provided with a base $8^a$ and braces $8^b$, secured near the top of the slideways 8. Both the base $8^a$ and the braces $8^b$ are secured to the side pieces 2 in any suitable manner, here shown as by screws $8^c$. The slideways 8 have a longitudinal slot $8^d$, in which the guiding and operating arms 9 slide. The guiding and operating arms 9 are secured at one end to the carriers 5 in any suitable manner, here shown as by being interposed between the side members $5^b$ of the carriers 5 and therein secured by rivets 9ª. The knives 7 are provided with a slot, through which the guiding and operating arms 9 are adapted to pass, and the said arms 9 are inclined to the carrier 5 at a suitable angle, so that when the carrier reaches its lowest position said arms 9 will have forced the knives 7 inward, so as to substantially close the lower parts of the knives 6, whereby it is evident the core of the recesses in the conduit-sections will be inclosed in the knives 6 and the knives 7. The upper ends of the carriers 5 are secured to and connected by cross-heads 10, which cross-heads 10 intersect and are secured at the center by a bolt 10ª, passing through each of the cross-heads 10 and secured therein by suitable means, herein shown as a nut 10ᵇ. In the form here shown the bolt 10ª is bifurcated at its lower end to receive one end of a bent lever 11, which end is pivoted in such bifurcation. The lever 11 is provided at its bent portion with a roller 11ª, adapted to move along a guiding-track 12, secured upon the top 3 of the frame 1. It is evident that when the handle of the lever 11 is borne down the roller 11ª will move toward the center of the top 3, raising the cross-heads 10 and withdrawing the knives 6 and the knives 7 from the recesses which have been cut in the conduit-sections, and that when the handle of the bent lever 11 is thrown upward, pressure being exerted at the same time downward, the roller 11ª will move from the center of the top 3, and the cross-heads 10 will be drawn downward, causing the carriers 5 to slide downward in the recesses 4, carrying the knives 6 and the knives 7 with them and cutting recesses in the conduit-sections. An inverted-U-shaped loop 13 straddles the cross-heads 10 at their intersection to limit their upward movement and prevent the carriers 5 being withdrawn from the recesses 4. The loop 13 has its open ends bent to form feet 13ª, which are secured to the top 3 of the frame 1 in any suitable manner, herein shown as by screws 13ᵇ.

The operation and advantages of my invention will be readily understood and appreciated.

The frame 1 is made to conform to the shape of the conduit-section, and when it is desired to cut recesses in such conduit-section to receive pins for uniting such sections for the purpose of alining the conduits and retaining them in such alinement the frame 1 is placed over the end of the section, the sides 2 surrounding the upper portion of the sides of the section and the top 3 resting upon the top of the section, whereby the material is supported and prevented from being spread, distorted, or broken in the operation. Suitable knives 6 and 7 having been chosen, the frame is placed in position, as described, and the handle of the bent lever 11 pressed upward, at the same time force being exerted to prevent the roller 11ª rising from the track 12 and the cross-heads 10 forced downward, carrying the carriers 5 and knives 6 and 7 with them. The knives 6 in their descent cut the material from the sides and front of the recess in the conduit-section, while at the same time the guiding and operating arms 9 force the knives 7 inwardly, cutting the material of the recesses in the conduit-section loose at the bottom of such recesses. When the knives 6 and 7 have reached the limit of their downward movement, the handle of the bent lever 11 is pressed downward, causing the roller 11ª to move toward the center of the top 3, raising the cross-heads 10, which withdraw the knives 6 and 7 from the recesses in the conduit-section, taking, with the knives 6, the core of such recess. The next operation of cutting such recesses forces such detached cores through the upper hollow portion of the knives 6 and clears such knives.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. A device of the class described, comprising a frame adapted to fit over the end of a conduit-section and around the upper portion of the sides thereof, means movably mounted in said frame for cutting recesses in such section, and means for operating such cutting means.

2. A device of the class described, comprising a frame constructed to fit the end of a conduit-section and extending down along the upper portion of the sides of such section to support the material of the section, coacting means for cutting recesses in the section and removing the core cut from such recess, and means for operating such coacting means.

3. A device of the class described, comprising a frame for covering the end and upper portion of the sides of a conduit-section, a pair of knives movably mounted in said frame in timed relation to each other for simultaneously cutting a recess in such section longitudinally and transversely, and means for operating said knives.

4. A device of the class described, comprising a frame for covering the end and upper portion of the sides of a conduit-section, a pair of knives movably mounted in said frame in timed relation to each other for simultaneously cutting the sides and bottom of a recess in such section, and means for operating said knives.

5. A device of the class described, comprising a frame constructed to fit the end and upper portion of the sides of a conduit-section, a hollow knife movably mounted in said frame, and the interior of which is shaped like the cross-section of the desired recess, and the cutting edges of which are inclined at an angle desired for the bottom of such recess, and means for operating said knife.

6. A device of the class described, comprising a frame constructed to fit the end and overlap the upper portions of the sides of a conduit-section, a knife slidably mounted therein and inclined at the angle desired for the bottom of the recess in such section, and means for operating said knife.

7. A device of the class described, comprising a frame for covering the end and upper portion of the sides of a conduit-section, a hollow knife movably mounted in said frame and the interior of which is shaped like the cross-section of the desired recess and the cutting edges of which are inclined at the angle desired for the bottom of such recess, a knife slidably mounted in the frame and inclined at the angle desired for the bottom of the recess in such section, and means for operating said knives.

8. A device of the class described, comprising a frame provided with a top and sides depending therefrom, and adapted to overlap the sides of a conduit-section, and having recesses with grooved side walls extending from the top of such sides toward the bottom, carriers sliding in such recesses, coacting knives secured to said carriers for cutting recesses in such sections, and means for raising and lowering said carriers.

In testimony whereof I have signed my name in the presence of the subscribing witnesses.

ROBERT W. LYLE.

Witnesses:
J. CLARK PYBAS,
LILLIE DUANE.